US005209063A

United States Patent [19]

Shirai et al.

[11] Patent Number: 5,209,063

[45] Date of Patent: May 11, 1993

[54] HYDRAULIC CIRCUIT UTILIZING A COMPENSATOR PRESSURE SELECTING VALUE

[75] Inventors: Kiyoshi Shirai; Shigeru Shinohara; Teruo Akiyama; Takahide Takiguchi; Naoki Ishizaki, all of Kawasaki, Japan

[73] Assignee: Kabushiki Kaisha Komatsu Seisakusho, Tokyo, Japan

[21] Appl. No.: 877,364

[22] PCT Filed: May 24, 1990

[86] PCT No.: PCT/JP90/00667

§ 371 Date: Apr. 9, 1991

§ 102(e) Date: Apr. 9, 1991

[87] PCT Pub. No.: WO90/14519

PCT Pub. Date: Nov. 29, 1990

Related U.S. Application Data

[63] Continuation of Ser. No. 646,739, Apr. 9, 1991, abandoned.

[30] Foreign Application Priority Data

May 24, 1989 [JP] Japan ................................ 1-128798
May 24, 1989 [JP] Japan ................................ 1-128799

[51] Int. Cl.[5] .............................................. F16D 31/02

[52] U.S. Cl. ....................................... 60/422; 60/426; 60/459; 60/484; 91/47; 91/531; 91/448; 91/447

[58] Field of Search ................ 60/420, 422, 426, 445, 60/452, 459, 484; 91/47, 49, 444, 448, 530, 531, 532, 447

[56] References Cited

U.S. PATENT DOCUMENTS 4,617,854 10/1986 Kropp .............................. 60/422 X
4,769,991 9/1988 Johnson ............................... 60/426
4,967,557 11/1990 Izumi et al. ....................... 60/426 X
5,048,293 9/1991 Aoyagi .............................. 60/452 X
5,056,312 10/1991 Hirata et al. ..................... 60/452 X
5,062,350 11/1991 Tanaka et al. ........................ 91/448

FOREIGN PATENT DOCUMENTS 60-11706 1/1985 Japan .
63-215467 9/1988 Japan .

*Primary Examiner*—Edward K. Look
*Assistant Examiner*—Todd Mattingly
*Attorney, Agent, or Firm*—Armstrong, Westerman, Hattori, McLeland & Naughton

[57] ABSTRACT

A hydraulic circuit arranged to prevent the load pressure in one of the hydraulic actuators at the time of starting from becoming abnormally high thereby preventing fluid under pressure from being relieved by the safety valve when a plurality of hydraulic actuators are operated at the same time, wherein the function of one of the pressure compensating valves is temporarily enhanced by introducing the load pressure in the hydraulic actuator so as to supply a large quantity of fluid under pressure to the hydraulic actuator connected to the pressure compensating valve so that the operating speed of the hydraulic actuator can be increased. This hydraulic circuit comprises a compensation pressure selecting valve adapted to supply normally the highest load pressure to the spring chambers of the pressure compensating valves, and supply the load pressure in the hydraulic actuator connected to each of the pressure compensating valves to the spring chamber of each of the pressure compensating valves when either one of the operating valves is operated for the full stroke.

7 Claims, 3 Drawing Sheets

HYDRAULIC CIRCUIT UTILIZING A COMPENSATOR PRESSURE SELECTING VALUE

This application is a continuation of application Ser. No. 646,739, filed Apr. 9, 1991, now abandoned.

BACKGROUND OF THE INVENTION

1. Field of the Invention

This invention relates to a hydraulic circuit means for supplying fluid under pressure discharged by a hydraulic pump to a plurality of hydraulic driving means such as hydraulic motors or hydraulic cylinders or the like (which are referred to simply as "hydraulic actuators" hereinbelow).

2. Description of the Related Art

In order to supply fluid under pressure discharged by a hydraulic pump to a plurality of hydraulic actuators, it is necessary to provide a plurality of operating valves in the delivery passage of the hydraulic pump and supply fluid under pressure to each of the hydraulic actuators by operating each of the operating valves. However, if during such a procedure, fluid under pressure is supplied to the plurality of hydraulic actuators at the same time, fluid under pressure is supplied only to hydraulic actuators whose load is low, and is not supplied to hydraulic actuators whose loads are high.

A hydraulic circuit addressing these above-mentioned difficulties, for example, is shown in Japanese Laid-open Patent Application No. SHO 59-197603, has been proposed.

This hydraulic circuit is shown schematically in FIG. 1. In this hydraulic circuit, a hydraulic pump 1 has a fluid discharge passage 2 which is provided with a first operating valve 3 and a second operating valve 4; a first circuit 7 connecting the first operating valve 3 and a first hydraulic actuator 5; and a second circuit 8 connecting the second operating valve 4 and a second hydraulic actuator 6. The first circuit 7 and the second circuit 8 are provided with a first pressure compensating valve 9 and a second pressure compensating valve 10, respectively. The arrangement provides that the load pressure $P_1$ and $P_2$ in the first and second hydraulic actuators 5 and 6, respectively, are introduced into a shuttle valve 11, where $P_1$ is compared with $P_2$ As a result, a higher load pressure is supplied to the first and second pressure compensating valves 9 and 10, respectively, in order to set the latter at the higher load pressure and keep the pressures at the outlets of the first and second operating valves 3 and 4 equal to each other so that when the first and second operating valves 3 and 4 are operated at the same time the fluid under pressure can be supplied to the first and second hydraulic actuators, respectively, at a flow division ratio which is proportional to the area of openings of the spools of the operating valves.

In such a hydraulic circuit, in order to prevent the load in the first hydraulic actuator 5 at the time of starting from becoming excessive so as to prevent the load pressure at the time of starting from becoming abnormally high, the first circuit 7 is provided with a safety valve 12 so as to relieve the abnormally high load pressure at the time of starting the first hydraulic actuator 5 to thereby set the safety valve 12 at a pressure $P_0$.

Therefore, when the first and second operating valves 3 and 4 are operated at the same time, the pressure $P_0$ for setting the safety valve 12 becomes higher than the load pressure $P_2$ in the second hydraulic actuator 6, and the setting pressure $P_0$ is applied through the shuttle valve 11 to spring chambers 9*a* and 10*a* of the first and second pressure compensating valves 9 and 10, respectively, thereby restricting the area of opening of each of the first and second pressure compensating valves 9 and 10 to set the latter at a pressure corresponding to the setting pressure $P_0$. As a result, the fluid under pressure discharged by the hydraulic pump 1 is restricted when passing through the second pressure compensating valve 10, and at the same time relieved from the safety valve 12 to the fluid tank, thereby reducing the amount of fluid to be supplied to the second hydraulic actuator 6, thus reducing the operating speed of the second hydraulic actuator 6.

In case, for example, the first hydraulic actuator 5 serves as a turning motor for a power shovel and a second hydraulic actuator 6 serves as a boom actuating cylinder, and a boom is moved upwards by the boom actuating cylinder while the upper turning body is being gyrated, the load pressure at the time of starting the turning motor becomes higher than the pressure $P_0$ at which the safety valve 12 is set, while the load pressure at the time of starting the boom actuating cylinder becomes lower than the pressure $P_0$ at which the safety valve 12 is set.

As a result, the area of opening of the second pressure compensating valve 10 is restricted by the pressure $P_0$ at which the safety valve 12 is set, and fluid pressure is relieved from the safety valve 12 to the fluid tank, and in consequence the fluid under pressure to be supplied to the boom actuating cylinder is reduced, thereby reducing the operating speed of the boom actuating cylinder, which results in reduction in the upwardly moving speed of the boom, thus causing insufficiency in the amount of upward movement thereof.

SUMMARY OF THE INVENTION

In view of the drawbacks in the prior art as set forth above, it is an object of the present invention to provide a hydraulic circuit, in which operation of one of a pair of operating valves in conjunction with operation of the other operating valve over a full stroke thereof causes operation of the respective pressure compensation valves depending upon load pressures of hydraulic actuators respectively associated thereto.

To achieve the above-mentioned object, according to a first aspect of the present invention, there is provided a hydraulic circuit comprising: a plurality of operating valves connected to a discharge passage of a hydraulic pump, the operating valves each supplying fluid under pressure to each of a plurality of hydraulic actuators, each of the operating valves having a pressure compensating valve provided on the side of the outlet thereof, and each of the pressure compensating valves being arranged to be set by the load pressure in the hydraulic actuator kept at the highest load pressure. The circuit comprises a compensation pressure selecting valve adapted to supply normally the highest load pressure to the spring chamber of each of the pressure compensating valves, and to supply the load pressure in each of the hydraulic actuators connected to each of the pressure compensating valves to the spring chamber of each of the pressure compensating valves when either one of the operating valves is operated for the full stroke.

Further, to achieve the above-mentioned object, according to a second aspect of the present invention, there is provided a hydraulic circuit comprising: a plurality of operating valves connected to a discharge passage of a hydraulic pump, where each of the operating valves supplies fluid under pressure to a plurality of hydraulic actuators, each of the operating valves having a pressure compensating valve provided on the side of the outlet thereof, and each of the pressure compensating valves being arranged to be set by the load pressure in the hydraulic actuator kept at the highest pressure. A compensation pressure selecting valve is provided in a circuit which supplies load pressure to one of the plurality of pressure compensating valves, the compensation pressure selecting valve having a first position supplying the highest load pressure, and a second position supplying the load pressure in the hydraulic actuator connected to the pressure compensating valve. The circuit further comprises a means for holding the compensation pressure selecting valve normally at the first position and switching the compensation pressure selecting valve to the second condition when the operating valve connected to the pressure compensating valve is operated for the full stroke, and at the same time the other operating valve is operated.

As is apparent from the above-mentioned aspects, the present invention provides a hydraulic control unit comprising a compensation pressure selecting valve in a fluid conduit which supplies load pressure to one pressure compensating valve, such that when one of the operating valves is operated for the full stroke and at the same time the operating valve is operated, the compensation pressure selecting valve is switched so as to supply the load pressure in the hydraulic actuator connected to the compensation pressure selecting valve to the spring chamber of the above-mentioned pressure compensating valve. Thus, to prevent the load pressure in one of the hydraulic actuators at the time of starting from becoming abnormally high and preventing fluid under pressure from being relieved from the safety valve when the plurality of hydraulic actuators are operated at the same time, the pressure compensating function of one of the pressure compensating valves is temporarily enhanced by introducing the load pressure in the hydraulic actuator in order to supply a large quantity of fluid under pressure to the hydraulic actuator connected to the pressure compensating valve so that the operating speed of the hydraulic actuator can be increased.

DETAILED DESCRIPTION OF THE PREFERRED EMBODIMENTS

The present invention will now be described in detail below by way of preferred embodiments thereof with reference to the accompanying drawings.

Figure 1:
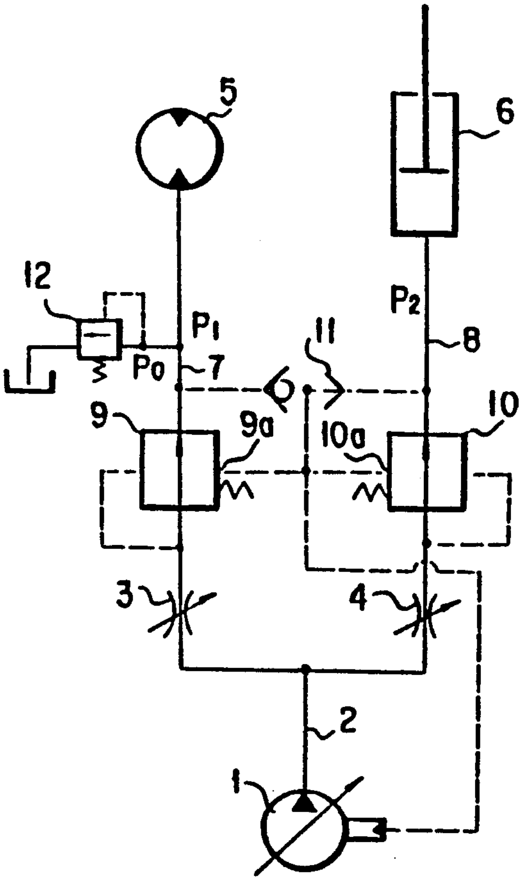
FIG. 1 PRIOR ART
FIG. 1 is a hydraulic circuit diagram showing a prior art example.
Figure 2:
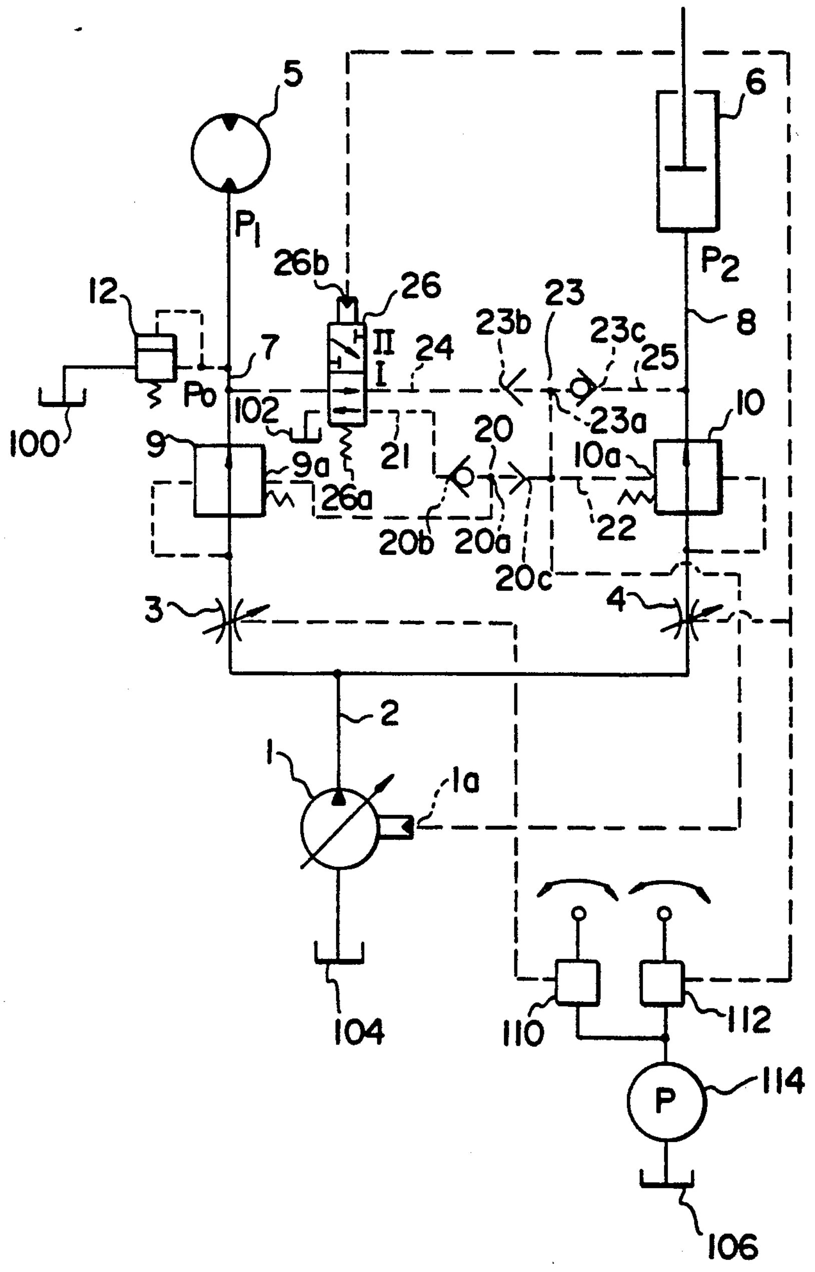
FIG. 2 is a hydraulic circuit diagram showing a first embodiment of the present invention.

First, the first embodiment will be described with reference to FIG. 2. In FIG. 2, a spring chamber 9a of a first pressure compensating valve 9 is connected with an outlet 20a of a first shuttle valve 20, and a first inlet 20b and a second inlet 20c of the latter are connected with a first pilot path 21 and a second pilot path 22, respectively. Further, the second pilot path 22 is connected with a spring chamber 10a of a second pressure compensating valve 10, an outlet 23a of a second shuttle valve 23, and a displacement controlling member la of a hydraulic pump 1, respectively. Hydraulic pump 1, is supplied with hydraulic fluid from reservoir 104.

A first inlet 23b and a second inlet 23c of the above-mentioned second shuttle valve 23 are connected with a third pilot path 24 and a fourth pilot path 25, respectively. And, the third pilot path 24 and the first pilot path 21 are connected by a compensation pressure selecting valve 26 with a first circuit 7, and the fourth pilot path 25 is connected with a second circuit 8.

The above-mentioned compensation pressure selecting valve 26 has a first position I where the first circuit 7 is connected with the third pilot path 24, and the first pilot path 21 is connected with a fluid tank or reservoir 102 thereby transmitting a load pressure $P_1$ generated by a first hydraulic actuator 5 to the second shuttle valve 23, and a second position II where the first circuit 7 is connected with the first pilot path 21, and the third pilot path 24 is disconnected, thereby transmitting the load pressure $P_1$ from the first hydraulic actuator 5 to the first shuttle valve 20. The compensation pressure selecting valve 26 is normally held by a spring 26a at its first position I, and is switched to its second position II when its pilot pressure receiving portion 26b is supplied with a pilot pressure. The pilot pressure receiving portion 26b is supplied with a pilot pressure for changing over a second operating valve 4. The pilot pressure for operating the second operating valve 4 is proportional to the operating stroke of an operating lever 112, which controls hydraulic pressure from pump 114, which is supplied with hydraulic fluid from reservoir 106. Operating lever 112 is also connected to second operating valve 4. Similarly, first operating valve 3 is operated by pilot pressure controlled by operating lever 110, which also its hydraulic fluid supply from pump 114. When the operating lever is operated for the full stroke to operate the second operating valve 4 for the full stroke, the pilot pressure will reach its maximum value so that the compensation pressure selecting valve 26 may assume its second position II against the biasing force of the spring 26a. Thus, when the operating lever 112 of the second operating valve is operated for the full stroke to operate the second operating valve 4 for the full stroke, the pilot pressure for operating the second operating valve 4 will reach a maximum value to allow the compensation pressure selecting valve 26 to assume its second position II so that the load pressure $P_1$ from the first hydraulic actuator 5 flows into and through the first pilot path 21 into the first shuttle valve 20 and is compared by the latter with the load pressure $P_2$ from the second hydraulic actuator 6. As a result of the comparison, the higher load pressure is transmitted to the spring chamber 9a of the first pressure compensating valve 9.

In the arrangement described above, if the load pressure $P_1$ at the time of starting the first hydraulic actuator 5 is abnormally high and the load pressure $P_2$ at the time of starting the second hydraulic actuator 6 is low when the first and second operating valves 3 an 4 are operated at the same time, the load pressures $P_1$ and $P_2$ at the time of starting the first and second hydraulic actuators 5 and 6 are supplied to the spring chambers 9a an 10a of the first and second pressure compensating valves 9 and 10, respectively.

Thus, since the first and second pressure compensating valves 9 and 10 are pressure-compensated by their respective load pressures $P_1$ and $P_2$ and the load pressure $P_2$ is supplied to the pump displacement controlling unit 1a as a load sensing pressure, the pump delivery pressure will become the load pressure $P_2$ plus the load sensing pressure differential, with the result that there is no relief loss from a safety valve 12 and the amount of fluid passing through the second pressure compensating valve 10 will increase, thereby increasing the amount of fluid to be supplied to the second hydraulic actuator 6, and hence, increasing the operating speed. Safety valve 12 is supplied with hydraulic fluid from reservoir 100.

And, when the first hydraulic actuator 5 is started and its load pressure $P_1$ becomes lower than the load pressure $P_2$ at the second hydraulic actuator 6, the higher load pressure $P_2$ is supplied through the first shuttle valve 20 to the spring chamber 9*a* of the first pressure compensating valve 9 so that the first and second pressure compensating valves 9 and 10 are pressure-compensated by the load pressure $P_2$ from the second hydraulic actuator 6, thereby distributing fluid under pressure to the first and second hydraulic actuators 5 and 6 in proportion to the degree of opening of the first and second operating valves 3 and 4, respectively.

Further, when the second operating valve 4 is not operated for its full stroke, but is operated in a fine control zone, the pilot pressure for operating the second operating valve 4 will not reach its maximum value, and the compensation pressure selecting valve 26 is held by its spring 26*a* at its first position I. As a result, even if the first and second operating valves 9 and 10 are operated at the same time, the compensation pressure selecting valve 26 is held at its first position I so that the load pressure $P_1$ from the first hydraulic actuator 5 acts on the spring chamber 10*a* of the second pressure compensating valve 10 through the second shuttle valve 23, thereby compensating the second pressure compensating valve 10.

Thus, when the first hydraulic actuator 5 serves as a turning motor for a power shovel and the second hydraulic actuator 6 serves as a boom actuating cylinder, and a boom operating valve is operated by means of a boom operating lever for its full stroke, and at the same time a turning operation valve is operated by means of a turning operation lever for its full stroke, the second pressure compensating valve 10 is pressure compensated by its own load pressure $P_2$, thereby increasing the area of the opening thereof and starting the turning motor by the load pressure of the boom. As a result, a great deal of fluid under pressure can be supplied to the boom actuating cylinder without having to relieve fluid pressure by the safety valve 12, thereby increasing the upwardly moving speed of the boom and preventing the amount of upward movement from becoming insufficient.

Further, when the boom operating valve is operated in a zone of relatively small control inputs, the second pressure compensating valve 10 is pressure-compensated by a higher load pressure, and therefore when the hydraulic actuator is subjected to heavy load while excavating the earth by turning the upper turning body and contacting one side surface of the bucket with one side surface of the hole to be dug, quick operation of the boom in the fine control zone can be prevented.

In the above-mentioned embodiment, the compensation pressure selecting valve 26 of a pilot pressure actuated type is used. However, it may be of a solenoid operated type wherein it is actuated by supplying to its solenoid electric current whose value is in proportion to the operating stroke of the operating valve.

Figure 3:
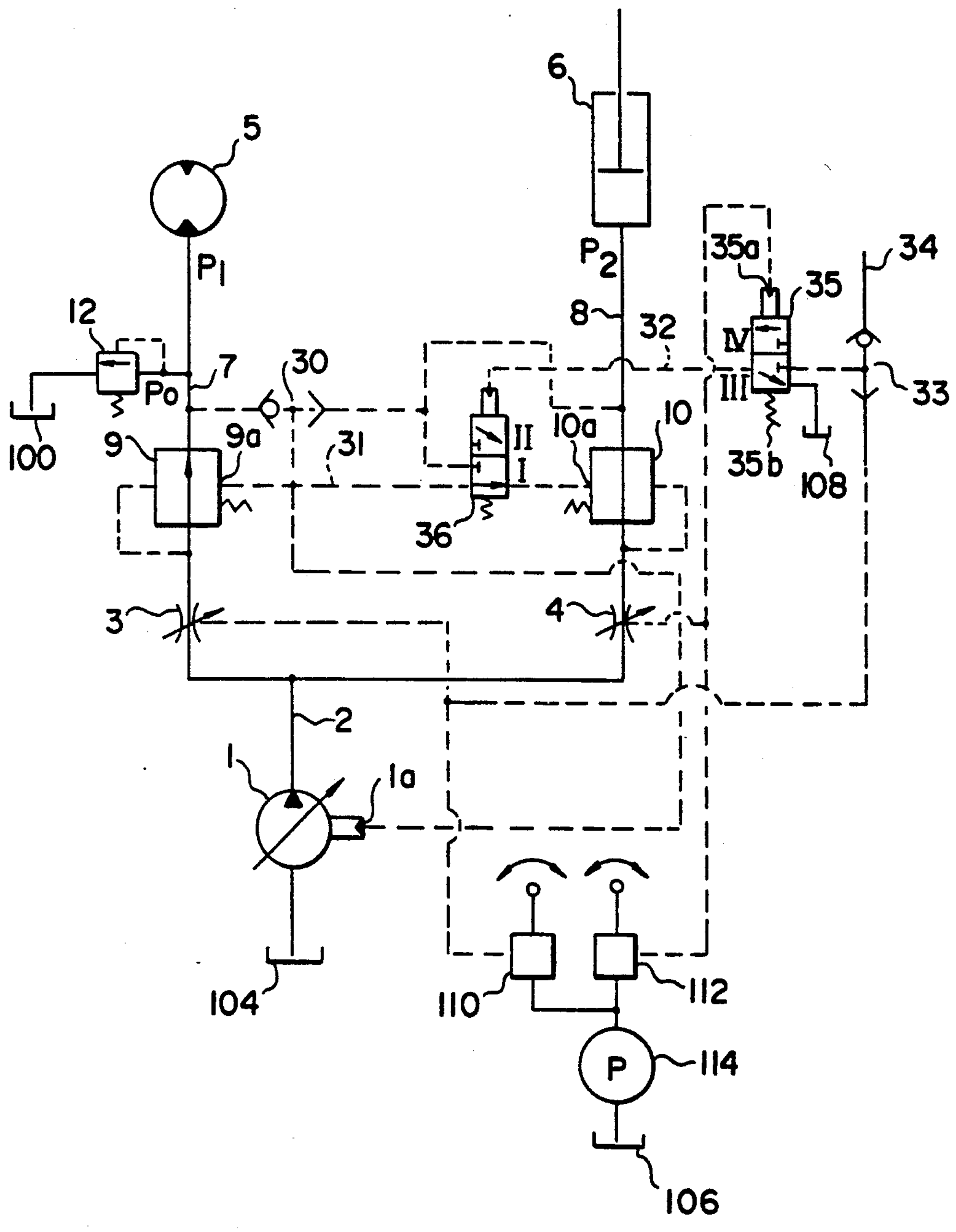
FIG. 3 is a hydraulic circuit diagram showing a second embodiment of the present invention.

A second embodiment of the present invention will be described below with reference to FIG. 3. As shown in FIG. 3, a circuit 31, which connects the spring chamber 10*a* of the second pressure compensating valve 10 and a shuttle valve 30, is provided with a compensation pressure selecting valve 36. The compensation pressure selecting valve 36 is normally held by the resiliency of its spring at its first position I where the output pressure from the shuttle valve 30 is supplied to the spring chamber 10*a* of the second pressure compensating valve 10. When the second pressure compensating valve 10 is supplied with a pilot pressure through the second circuit 8, it is changed over to its second position II where the pressure in the second circuit 8, i.e., the load pressure $P_2$ from the second hydraulic actuator 6 is supplied to the spring chamber 10*a* of the second pressure compensating valve 10.

The above-mentioned compensation pressure selecting valve 36 has a pilot circuit 32 which is connected through a shuttle valve 33 with a pilot circuit 34 for operating the first operating valve 3. The pilot circuit 32 is provided with a selector valve 35.

The above-mentioned selector valve 35 is normally held by the resiliency of its spring at its closed position III where the pilot circuit 32 is connected with the fluid tank or reservoir 108. When the selector valve 35 receives a pilot pressure, it is switched to its open position IV where the pilot circuit 32 is connected with the shuttle valve 33. The pilot pressure receiving portion 35*a* of the selector valve 35 is supplied with a pilot pressure for operating the second operating valve 4, whose valve is proportional to the operating stroke of the operating lever 112, which controls hydraulic pressure from pump 114, which is supplied with hydraulic fluid from reservoir 106. Similarly, first operating valve 3 is operated by pilot pressure controlled by operating lever 110, which also receives its hydraulic fluid supply from pump 114. The pilot pressure will reach the maximum value when the operating lever 112 is operated for the full stroke to operate the second operating valve 4 for the full stroke. The arrangement is made such than when the selector valve 35 receives the maximum value it is switched to the open position IV against the resilient force of the spring 35*b*.

In this arrangement, when the first and second operating valves 3 and 4 are operated at the same time, the pilot pressure for operating the second operating valve 4 is supplied to the pilot pressure receiving portion 35*a* of the selector valve 35 so as to operate the second operating valve 4. When pilot pressure reaches the maximum value the selector valve 35 is switched to its open position IV. Simultaneously, the pilot pressure for operating the first operating valve 3 in the pilot circuit 34 will flow through the shuttle valve 33 into the pilot circuit 32. The pilot pressure is supplied through the selector valve 35 into the compensation pressure selecting valve 36 so as to cause the selector valve 36 to assume its second position II.

As a result, the load pressure $P_2$ from the second hydraulic actuator 6 is transmitted to the spring chamber 10*a* of the second pressure compensating valve 10 so that no pressure compensating effect is provided, and the area of the opening thereof is increased, thereby increasing the amount of fluid supplied to the second hydraulic actuator 6 so as to increase the operating speed of the same.

Further, when the second operating valve 4 is not operated for the full stroke, but operated in a fine control zone, the pilot pressure for operating the second operating valve 4 will not reach its maximum value, so that the selector valve 35 is held by its spring 35*b* at its closed position III, and as a result, even if the first and second operating valves 3 and 4 are operated at the same time, the compensation pressure selecting valve 36 is held at its first position I so as to transmit the load pressure $P_1$ from the first hydraulic actuator 5 to the spring chamber 10*a* of the second pressure compensating valve 10 to thereby compensate the latter.

Accordingly, when the first hydraulic actuator 5 serves as a power shovel turning motor and the second hydraulic actuator 6 serves as a boom actuating cylinder, and the boom operating valve is operated by a boom operating valve for the full stroke, and at the same time, the turning operation valve is operated by a turning operation lever for the full stroke, the second pressure compensating valve 10 is not pressure-compensated and the area of the opening thereof is increased so that no fluid under pressure is relieved from the safety valve 12 and excessive load pressure is not applied to the turning motor at the time of starting it. Thus, a large quantity of fluid under pressure is supplied to the boom actuating cylinder, increasing the upwardly moving speed of the boom and preventing the amount of upward movement of the boom from becoming insufficient.

Further, when the boom operating valve is operated in a fine control zone, the second pressure compensating valve is pressure-compensated by a higher load pressure, and therefore when the hydraulic actuator is subjected to heavy load while excavating the earth by turning the upper turning body and contacting one side surface of the bucket with one side surface of the hole to be dug, quick operation of the boom in the fine control zone can be prevented.

In the second embodiment, the compensation pressure selector valve 36 and the selector valve 35 are preferably of a pilot pressure actuated type. These valves may also be a solenoid actuated type, wherein they are actuated by supplying their solenoids with electric current whose value is proportional to the operational stroke o their respective operating valves.

What is claimed is:

1. A hydraulic circuit comprising:

a plurality of operating valves connected to a discharge passage of a hydraulic pump, the operating valves each regulating the flow of fluid under pressure to a plurality of hydraulic actuators, each of the operating valves having a pressure compensating valve provided on the side thereof, between each of the operating valves and the plurality of hydraulic actuators, each of the pressure compensating valves being arranged to be set by the load pressure in the hydraulic actuator loaded with the highest pressure; and a compensation pressure selecting valve for normally supplying the highest load pressure to the spring chamber of each of the pressure compensating valves, and supplying each of spring chambers of the pressure compensation valves in the load pressures in the hydraulic actuators connected to each of the pressure compensating valves when either one of the operating valves is operated in conjunction with operation of the other operating valve for the full stroke.

2. A hydraulic circuit comprising:

a plurality of operating valves connected to a discharge passage of a hydraulic pump, the operating valves each regulating the flow of fluid under pressure to a plurality of hydraulic actuators, each of the operating valves having a pressure compensating valve provided on the side thereof, between each of the operating valves and the plurality of hydraulic actuator, each of the pressure compensating valves being arranged to be set by the load pressure in the hydraulic actuator loaded with the highest pressure;

a compensation pressure selecting valve provided in a circuit which supplies load pressure to either one of the pressure compensating valves, the compensation pressure selecting valve having a first position supplying the highest load pressure, and a second position supplying the load pressure in the hydraulic actuator connected to said one of the pressure compensating valves; and means for holding normally said compensation pressure selecting valve normally at the first position and switching the compensation pressure selecting valve to the second position when the operating valve connected to said one of the pressure compensating valve is switched for the maximum operating range, and at the same time the other operating valve is operated.

3. A hydraulic circuit system comprising:

a pressurized fluid source means;

a first hydraulic load performing a predetermined first work employing a hydraulic pressure supplied from said pressurized fluid source means;

a second hydraulic load performing a predetermined second work employing a hydraulic pressure supplied form said pressurized fluid source means;

a first operating valve means disposed between said pressurized fluid source and said first hydraulic load and responsive to a manual input thereto for selectively distributing hydraulic pressure to said first hydraulic load;

a second operating valve means disposed between said pressurized fluid source and second hydraulic load and responsive to manual input thereto for selectively distributing hydraulic pressure to said second hydraulic load;

a first pressure compensation valve means disposed between said first operating valve and said first hydraulic load for regulating the hydraulic pressure supplied to said first hydraulic load on the basis of a reference pressure supplied thereto;

a second pressure compensation valve means disposed between said second operating valve and said second hydraulic load for regulating the hydraulic pressure supplied to said second hydraulic load on the basis of a reference pressure supplied thereto; and means for supplying said reference pressures for respective of said first and second pressure compensation valve means, said reference pressure supplying means operative in a normally active first mode for determining a common reference pressure for both of said first and second pressure compensation valves based on load pressures in said first and second hydraulic loads and a second mode active upon simultaneous operation of said first and second operation valves for determining reference pressures independently for respective of said first and second pressure compensation valves depending upon the load pressures of respectively corresponding first and second hydraulic loads.

4. A hydraulic circuit system comprising:

a pressurized fluid source means;

a first hydraulic load performing a predetermined first work employing a hydraulic pressure supplied from said pressurized fluid source means;

a second hydraulic load performing a predetermined second work employing a hydraulic pressure supplied form said pressurized fluid source means;

a first operating valve means disposed between said pressurized fluid-source and said first hydraulic load and responsive to a manual input thereto for selectively distributing hydraulic pressure to said first hydraulic load;

a second operating valve means disposed between said pressurized fluid source and second hydraulic load and responsive to manual input thereto for selectively distributing hydraulic pressure to said second hydraulic load;

a first pressure compensation valve means disposed between said first operating valve and said first hydraulic load for regulating the hydraulic pressure supplied to said first hydraulic load on the basis of a reference pressure supplied thereto;

a second pressure compensation valve means disposed between said second operating valve and said second hydraulic load for regulating the hydraulic pressure supplied to said second hydraulic load on the basis of a reference pressure supplied thereto; and means for supplying said reference pressures for respective of said first and second pressure compensation valve means, said reference pressure supplying means operative in a normally active first mode for determining a common reference pressure for both of said first and second pressure compensation valves based on load pressures in said first and second hydraulic loads and a second mode active upon simultaneous operation of said first and second operation valves with operation of one of said first and second operation valves over a full valve stroke thereof for determining reference pressures independently for respective of said first and second pressure compensation valves depending upon the load pressures of respectively corresponding first and second hydraulic loads.

5. A hydraulic circuit system comprising:

a pressurized fluid source means;

a first hydraulic load performing a predetermined first work employing a hydraulic pressure supplied from said pressurized fluid source means;

a second hydraulic load performing a predetermined second work employing a hydraulic pressure supplied form said pressurized fluid source means;

a first operating valve means disposed between said pressurized fluid source and said first hydraulic load and responsive to a manual input thereto for selectively distributing hydraulic pressure to said first hydraulic load;

a second operating valve means disposed between said pressurized fluid source and second hydraulic load and responsive to manual input thereto for selectively distributing hydraulic pressure to said second hydraulic load;

a first pressure compensation valve means disposed between said first operating valve and said first hydraulic load for regulating the hydraulic pressure supplied to said first hydraulic load on the basis of a reference pressure supplied thereto;

a second pressure compensation valve means disposed between said second operating valve and said second hydraulic load for regulating the hydraulic pressure supplied to said second hydraulic load on the basis of a reference pressure supplied thereto; and means for supplying said reference pressures for respective of said first and second pressure compensation valve means, said reference pressure supplying means operative in a normally active first mode for determining a common reference pressure for both of said first and second pressure compensation valves depending upon the highest one of load pressures in said first and second hydraulic loads and a second mode active upon simultaneous operation of said first and second operation valves with operation of one of said first and second operation valves over a full valve stroke thereof for determining reference pressures independently for respective of said first and second pressure compensation valves depending upon the load pressures of respectively corresponding first and second hydraulic loads.

6. A hydraulic circuit system comprising:

a pressurized fluid source means;

a first hydraulic load performing a predetermined first work employing a hydraulic pressure supplied from said pressurized fluid source means through a first hydraulic line;

a second hydraulic load performing a predetermined second work employing a hydraulic pressure supplied form said pressurized fluid source means through a second hydraulic line;

a first operating valve means disposed in said first hydraulic line between said pressurized fluid source and said first hydraulic load and responsive to a manual input thereto for selectively distributing hydraulic pressure to said first hydraulic load;

a second operating valve means disposed in said second hydraulic line between said pressurized fluid source and second hydraulic load and responsive to manual input thereto for selectively distributing hydraulic pressure to said second hydraulic load;

a first pressure compensation valve means disposed in said first hydraulic line between said first operating valve and said first hydraulic load for regulating the hydraulic pressure supplied to said first hydraulic load on the basis of a reference pressure supplied thereto;

a second pressure compensation valve means disposed in said second hydraulic line between said second operating valve and said second hydraulic load for regulating the hydraulic pressure supplied to said second hydraulic load on the basis of a reference pressure supplied thereto; and means for supplying said reference pressures disposed between said first and second hydraulic lines for respective of said first and second pressure compensation valve means, said reference pressure supplying means operative in a first mode for determining a common reference pressure for both of said first and second pressure compensation valves depending upon the highest one of load pressures in said first and second hydraulic loads and a second mode for determining reference pressures independently for respective of said first and second pressure compensation valves depending upon the load pressures of respectively corresponding first and second hydraulic loads, and said reference pressure supplying means being responsive to a line pressure of one of said first and second lines upon operation of corresponding one of said first and second operation valves for switching operational mode between said first and second modes.

7. A hydraulic circuit system comprising:

a pressurized fluid source means;

a first hydraulic load performing a predetermined first work employing a hydraulic pressure supplied from said pressurized fluid source means through a first hydraulic line;

a second hydraulic load performing a predetermined second work employing a hydraulic pressure supplied form said pressurized fluid source means through a second hydraulic line;

a first operating valve means disposed in said first hydraulic line between said pressurized fluid source and said first hydraulic load and responsive to a manual input thereto for selectively distributing hydraulic pressure to said first hydraulic load;

a second operating valve means disposed in said second hydraulic line between said pressurized fluid source and second hydraulic load and responsive to manual input thereto for selectively distributing hydraulic pressure to said second hydraulic load;

a first pressure compensation valve means disposed in said first hydraulic line between said first operating valve and said first hydraulic load for regulating the hydraulic pressure supplied to said first hydraulic load on the basis of a reference pressure supplied thereto;

a second pressure compensation valve means disposed in said second hydraulic line between said second operating valve and said second hydraulic load for regulating the hydraulic pressure supplied to said second hydraulic load on the basis of a reference pressure supplied thereto; and means for supplying said reference pressures disposed between said first and second hydraulic lines for respective of said first and second pressure compensation valve means, said reference pressure supplying means operative in a first mode for determining a common reference pressure for both of said first and second pressure compensation valves depending upon the highest one of load pressures in said first and second hydraulic loads and a second mode for determining reference pressures independently for respective of said first and second pressure compensation valves depending upon the load pressures of respectively corresponding first and second hydraulic loads, and said reference pressure supplying means being responsive to a line pressure of one of said first and second lines upon operation of corresponding one of said first and second operation valves for switching operational mode from said first mode to said second mode at a predetermined maximum line pressure at said one of first and second lines induced to the full valve stroke of the corresponding one of first and second operation valve.

* * * * *